(12) United States Patent
Mista

(10) Patent No.: US 6,322,255 B1
(45) Date of Patent: Nov. 27, 2001

(54) JOINT BEARING BETWEEN TWO STRUCTURAL ELEMENTS OF WARP KNITTING MACHINES

(75) Inventor: Kresimir Mista, Heusenstamm (DE)

(73) Assignee: Karl Mayer Textilmaschinenfabrik, Obertshausen (DE)

( * ) Notice: Subject to any disclaimer, the term of this patent is extended or adjusted under 35 U.S.C. 154(b) by 0 days.

(21) Appl. No.: 09/458,617

(22) Filed: Dec. 10, 1999

(30) Foreign Application Priority Data

Jan. 25, 1999 (DE) .............................................. 199 02 706

(51) Int. Cl.[7] ............................ F16C 33/46; F16C 33/78; F16C 33/66
(52) U.S. Cl. .......................... 384/559; 384/569; 384/585; 384/473; 384/485
(58) Field of Search ..................................... 384/548, 559, 384/564, 569, 584, 585, 456, 462, 473, 474, 477, 484, 485; 403/71, 72, 66, 26, 150, 154; 74/519; 66/204–208

(56) References Cited

U.S. PATENT DOCUMENTS

| | | | |
|---|---|---|---|
| 1,184,471 | * 5/1916 | Medler | 384/548 |
| 3,476,021 | * 11/1969 | Williams | 403/154 |
| 4,023,867 | * 5/1977 | Piller | 384/564 |
| 4,478,066 | * 10/1984 | Olschewski et al. | 384/564 X |
| 5,320,027 | * 6/1994 | Saitoh | 384/473 X |
| 5,362,171 | * 11/1994 | Ritschel | 403/66 |
| 5,407,284 | * 4/1995 | Vinciguerra et al. | 384/561 |

* cited by examiner

Primary Examiner—Thomas R. Hannon
(74) Attorney, Agent, or Firm—Selitto, Behr & Kim

(57) ABSTRACT

A joint bearing 8 is provided between two structural elements of which one is connected with the connecting joint 17 and the other with a hinge pin. In the connecting joint 17, there is provided a pressed-in outer ring 28, a cage 30 located between the hinge pin and the outer ring. The cage 30 is provided with cylindrical roller bodies 31, as well as stops 34, for the axial guiding of the cage. The outer ring 28 is so thin-walled that after pressing into place its inner circumference, must be reworked. The outer ring 28 only extends over the length of the roller body 31. The stops 34 are separated from the outer ring 28 and are attached to the connecting joint 17. Further, the hinge pin 20 may be constructed as a tube 19. The appropriate structural element (lever 9) contacts the outside of tube 19. By means of an outwardly protruding screw or other fastener 21 from the inner space of the tube, this structural element is attached onto the tube wall. With the foregoing, the mass of the joint bearing to be moved is substantially reduced.

20 Claims, 2 Drawing Sheets

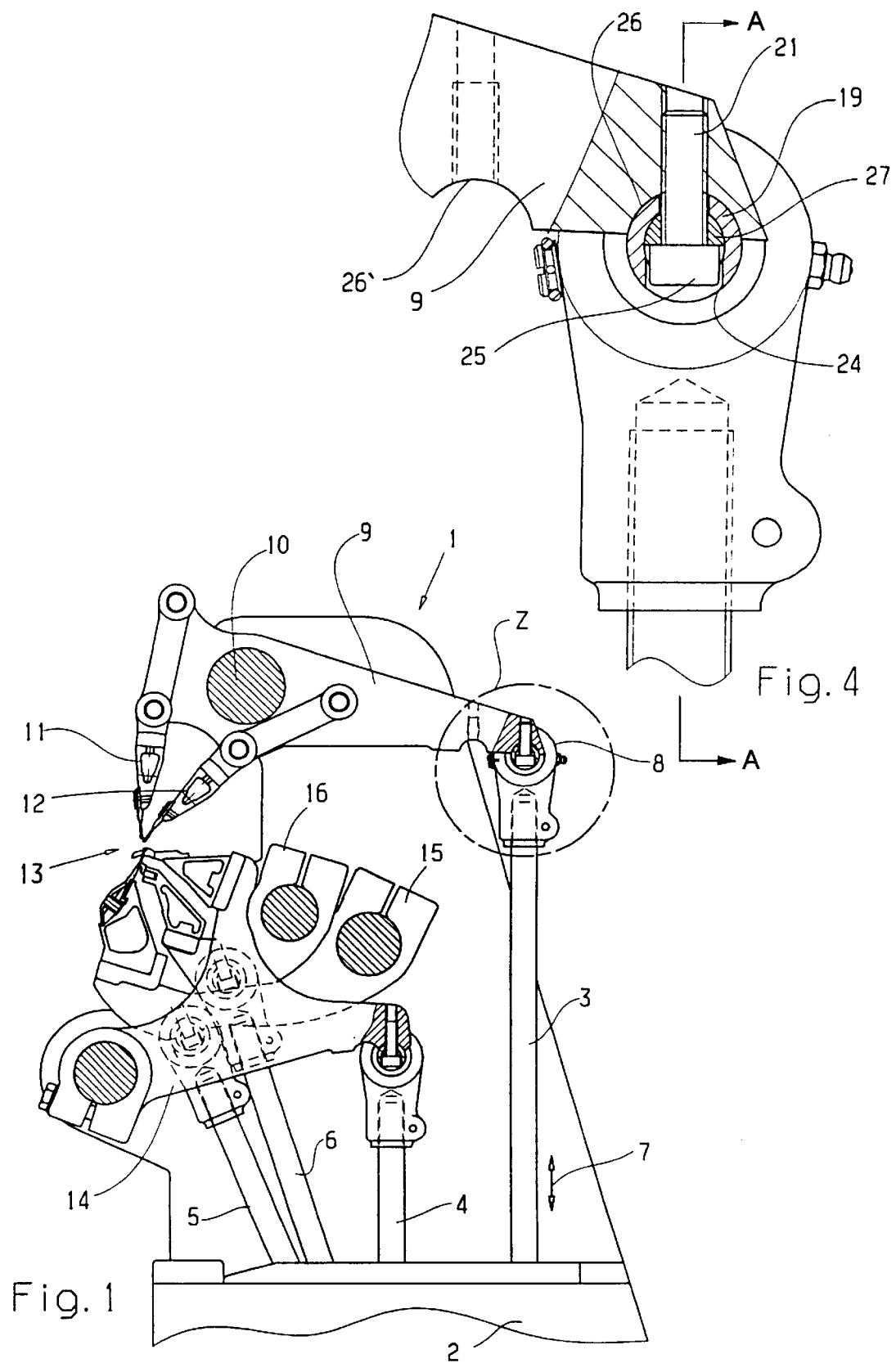

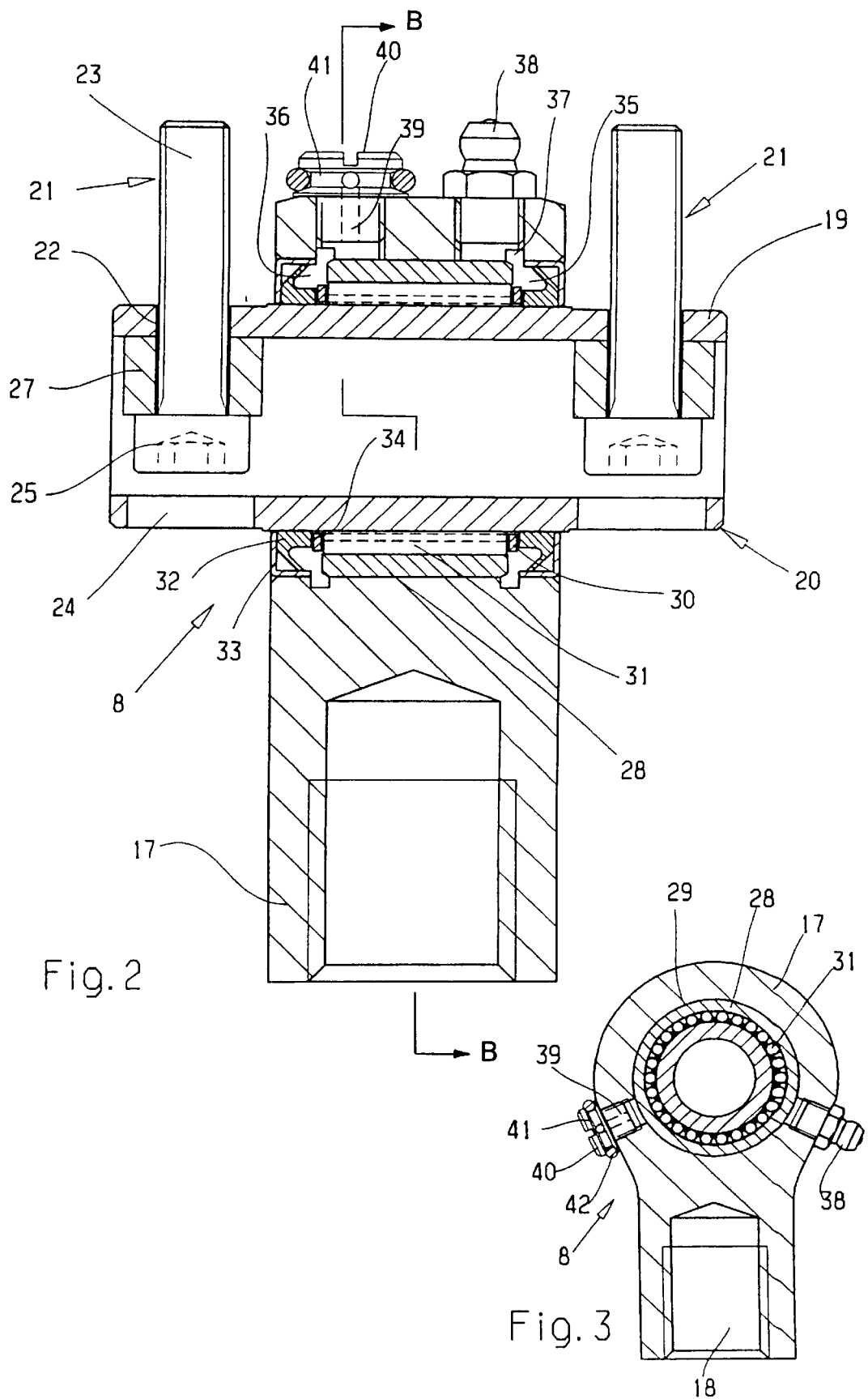

JOINT BEARING BETWEEN TWO STRUCTURAL ELEMENTS OF WARP KNITTING MACHINES

BACKGROUND OF THE INVENTION

1. Field of the Invention

The present invention relates to a joint bearing between two structural elements wherein one is connected with the connecting joint and the other with the hinge pivot, suitably for warp knitting machines, and having (a) an outer ring pressed into the connecting joint, and (b) a cage located between the hinge pin and the outer ring, with cylindrical roller bodies and stops for the actual axial guidance of the cage; as well as versions wherein one of the structural elements is connected to the connecting joint and the other to the hinge pin.

2. Description of Related Art

Swinging movements are necessary for the formation of stitches in warp knitting machines, among other things. These movements are created, for example, by coupling mechanisms in the machine bed and transmitted to the levers carrying the knitting elements via push rods. Since these push rods are driven in pushing and pulling directions, they must be connected with the levers via hinges. This problem also arises with other machines, for example printing machines.

In the known, commercially available warp knitting machines, commercially available needle roller bearings are introduced into the eye of the hinge. Actually, these bearings are designed for rotational movement. In warp knitting machines however, they only swing over a rather small range angle of about 10°. They are however subject to rather high alternate loading (acceleration greater than 1,000 m/sec$^2$). In order that they are not destroyed, they must be provided in a play-free environment. This is achieved when the outer ring of the joint bearing is pressed into the connecting joint, in such a way that in the at-rest position, there is a pretensioning. In order that this does not negatively affect the roundness of the inner circumference of the outer ring, the latter must have comparatively large wall strength. In the known case, the outer ring is provided at both ends with an inwardly protruding stop, which secures the axial position of the needle cage for the needle bearing. The lever is connected with a hinge pin by means of a clamping cap, which lies outside the hinge pin. Because of the high acceleration, it is also important that the moved mass is minimal. One has principally attempted to achieve this end by the use of light metal.

SUMMARY OF THE INVENTION

In accordance with the illustrative embodiments demonstrating features and advantages of the present invention, there is provided a joint bearing between two structural elements, one being connected with a connecting joint and the other with a hinge pin, suitably for warp knitting machines. This joint bearing has an outer ring and a cage. The outer ring is adapted for pressing into the connecting joint. The outer ring is so thin-walled that after pressing into place, its inner circumference must be reworked to restore roundness. The cage is located between the hinge pin and the outer ring, and has (a) a plurality of cylindrical roller bodies, and (b) a pair of stops for the actual axial guidance of the cage. The outer ring stretches substantially only along the length of the roller bodies. The stops are separated from the outer ring and are adapted for attachment to the connecting joint.

In accordance with another aspect of the present invention the foregoing joint bearing has, in combination, a connecting joint and a tubular hinge pin. The joint bearing also has a lever with a concavity lying in contact with the outside of the tubular pin. The lever is attached to the tubular pin by at least one fastener protruding out of the interior of the tube. The outer ring is pressed into the connecting joint and reworked to restore roundness.

In accordance with another aspect of the present invention, a method is provided for installing a joint bearing in combination with two structural elements, suitably for warp knitting machines. The method employs a connecting joint, a tubular hinge pin, a lever with a concavity, a thin-walled outer ring, and a cage with a plurality of cylindrical roller bodies, and a pair of stops. The method includes the step of pressing the outer ring into the connecting joint and reworking the outer ring to restore roundness. The outer ring is so thin-walled that after pressing into place, its inner circumference must be reworked to restore roundness. Another step is installing the tubular hinge pin and the cage inside the outer ring by: (a) locating the cage between the hinge pin and the outer ring, (b) allowing the stops to perform the actual axial guidance of the cage, (c) positioning the cage with the outer ring stretching substantially only along the length of the roller bodies, and (d) separating the stops from the outer ring and attaching the stops to the connecting joint. The method also includes the step of attaching the lever to the tubular hinge pin by (a) placing the concavity in contact with the outside of the tubular pin, and (b) attaching the lever to the tubular pin by at least one fastener protruding out of the interior of the tube.

An object of the present invention is to provide that, in a joint bearing of the above-described art, the mass to be moved is held as small as possible. The task of the present invention is solved by a joint bearing between two structural elements from which the one is connected with the connecting joint and the other with the hinge pivot, suitably for warp knitting machines. An outer ring is pressed into the connecting joint and a cage is located between the hinge pin and the outer ring. The cage has cylindrical roller bodies and stops for the actual axial guidance of the cage. The outer ring is so thin-walled that after pressing in, its inner circumference must be reworked. Also, the outer ring only stretches along the length of the roller body, and the stops are attached to the connecting joint, separate from the outer ring.

Preferably by means of reducing the wall thickness and the shortened length of the outer ring, its mass is reduced. Furthermore, the dimensions of the connecting joint and thus its mass can therefore be kept smaller.

However, it is no longer ensured that the outer ring, because of its reduced wall strength, is still precisely round after being pressed in. Therefore, post-processing is necessary. This is easy to achieve since one is only concerned with a continuous cylindrical surface. Since the preferred outer ring of the connecting joint is supported and comprises a durable material, the joint bearing has a high load capacity and a long operating life.

The preferred sealing rings are of a readily available lubricating means and are used to form the stops; wherein the sealing rings provided to both ends of the cage form the stops. These preferred stops have a much lower mass than the stops heretofore provided to the outer ring.

In the further development, sealing rings are supported on the outer sides preferably by security rings, supported on the connecting joint; thus the stops are secured in their position by protective rings.

The preferred lubricating means has annular spaces at both ends of the cage for the storage of grease, wherein one is connected to the grease input port and the other to a grease exit port. This permits the joint bearing to take up a relatively large store of grease, so that one is able to operate with rather large service intervals. The annular-formed grease storage space utilizes the space saved by the shortening of the outer ring. By the means thereof, the grease is equally distributed over the entire roller body. During supplemental lubrication, the excess grease can be readily wiped off since it exits from the grease exit when the annular grooves are filled.

Utilizing preferred annular grooves, wherein the annular spaces are increased by annular grooves on the inner circumference of the connecting joint, the storage space for the grease reserve can be further increased.

The preferred valve has a valve opening that can open as a result of excess pressure in the lubricating means, thereby serving to ensure that the grease storage space is entirely filled before the grease exit is opened. This is achieved by a valve which preferably comprises an O-ring, which is located in an encircling groove into which a grease exit channel opens.

The exchangeability of structural parts for the grease input and the grease exit reduces the need for a plurality of parts.

The hinge pin may be constructed as a tube and the structural element provided thereto, a lever, may have a concavity lying in contact with the outside of the tube. This lever may be attached to the wall of the tube by at least one screw (or other fastener) protruding out of the interior of the tube. This is particularly advantageous in combination with joint bearings described above, but also leads to a considerable improvement.

The preferred tube has a substantially smaller mass than a hinge pin of solid material and the screw (or other fastener) located in the interior of the tube, has a much smaller mass than a clamping lid lying exterior to a hinge pivot.

In one embodiment the tube, on both sides of the connecting joint, has a smaller transverse boring for the protrusion therethrough of screw shaft (or other fastener), and in alignment therewith a large transverse boring for the protrusion therethrough of the fastener head. The inner surface of the tube has a fitting profile base forming an abutment for the appropriate screw (or other fastener). Thus simple means are sufficient to connect the tube with the appropriate structural element.

The arrangement wherein the structural element or lever has at least two concavities next to each other, makes it very simple to position the hinge pin at another position of the appropriate structural element. This makes it possible for the second position to lie very close to the first position, even with a separation, which is smaller than the diameter of the hinge pivot.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein:

FIG. 1 is side-elevational view in partial cross-section of a portion of a warp knitting machine;

FIG. 2 is a cross-sectional, elevational view of the joint bearing of the present invention, taken along line A—A of FIG. 4, but with the grease nipples repositioned;

FIG. 3 is a cross-section of the joint bearing of FIG. 2, taken along line B—B of FIG. 2; and FIG. 4 is an expanded view of the region Z in FIG. 1.

DETAILED DESCRIPTION OF THE PREFERRED EMBODIMENTS

Referring to FIGS. 1–4, the illustrated warp knitting machine (1) comprises a machine bed (2) from which push rods (3, 4, 5, and 6) protrude and which are moved to and fro by a coupler mechanism, which is indicated by arrow (7). The push rod (3) drives a lever (9) via a joint bearing (8), which moves around a fixed axis. (10) and swings two guide bars (11, 12) in working area (13) of the warp knitting machine in a to-and-fro manner.

In a similar way, the push rod (4) drives a lever (14) for a stitch comb. The push rod (5), through a lever (15) handles the needles, and push rod (6), through a lever (16) handles the slider of the needles.

The joint bearing (8) comprises a connecting joint (17), which is connected to lever (3) by means of a screw thread (18), as well as a hinge pin (20) in the form of a tube (19), which is connected with lever (9) via screws (or other fasteners) (21). At each end, tube (19) has a small transverse bore (22) for the protrusion therethrough of screw shaft (23) (or other fastener) and, in extension thereof a larger transverse bore (24) for the insertion of a fastener head (25) having an internal hexagonal opening (Allen screw).

For the purpose of mating with the outer diameter of tube (19), the lever (9) has a substantially semi-circular concavity (26). For the fitting onto the inner circumference of tube (19), there are provided profile segments (27), which are penetrated by fastener shaft (23). A second substantially semicircular concavity (26') is provided adjacent to concavity (26) on lever (9). The lever (9) can therefore be displaced in a position opposite to that shown in FIG. 4 onto the connecting joint (8). In order to do this, it is merely necessary to loosen two fasteners (21) and after transferring, the hinge pin (20) is again pulled tight using the appropriate thread bores. In contrast to the known clamping cap with holding screws running outside the hinge pin, the present fasteners (21) do not interfere with providing that the space between the two concavities (26, 26') is smaller than the diameter of the hinge pin (20).

The joint bearing (8) has an outer ring (28), which is pressed into the bore (29) of the connecting joint (17). It has such a small wall thickness that in the process of pressing it in, the exact roundness is lost and post-processing is required. This post processing can be done by reworking outer ring (28) with a grinder, drill, lathe, milling machine or other material-removing equipment Typical wall thicknesses are of the order of 1.5–2.5 mm, suitably 2–3 mm.

Between the hinge pivots (20) and the outer ring (28), there are located cylindrical rolling bodies (31) (needles), in a cage (30). Sealing rings (32) made of low friction plastic such as for example PTFE, which are held in place in the connecting joint (17) by metallic protecting rings (33). Rings (32) form stops (34) for the actual guiding of the cage (30). The thin-walled outer ring (28) only extends over the length of the roller (31). The stops (34) formed by the sealing rings (32) have a much smaller mass than the known stops provided to the outer ring.

On both ends of the cage (30), there are lubricating means employing annular spaces (35,36) for the storage of grease.

The annular spaces are bordered by the sealing rings (32) and the outer ring (28) and are increased by annular groove (37) in connecting joint (17). The annular space (35) is connected with a grease input port in lubrication nipple (38). The annular space (36) is located above an exit port (39), in combination with a valve (40) in the form of a separate projection or fitting threaded into connecting joint (17). Valve (40) can open in case of over-pressure in the lubricating system.

The valve (40) comprises an O-ring (42) located in an encircling groove (41), which lifts from the groove base when grease exits from the exit port (39) under pressure.

When grease is introduced via the lubrication nipple (38), the annular space (35) is filled. The grease is evenly distributed over the location of the roller body (31), subsequently fills the annular space (36), and via exit port (39) reaches valve (40). As soon as this valve opens and some grease exits, the filling arrangement is ended and the exiting grease can be readily wiped off.

The sealing rings (32) can have any desired form, for example, labyrinth sealings, stemma rings, or the like. In particular, lip sealing is suitable.

FIG. 3 shows the actual arrangement of the lubrication nipple (38) and the exit valve (30), whereas in FIG. 2 these parts are shown next to each other.

Because of the reduced wall thickness of the outer ring (28), not only is the mass reduced in comparison with the known joint bearings, but the outer diameter is reduced as well. Consequently, the outer diameter of the connecting joint (17) can be smaller and its mass correspondingly reduced.

A further reduction of mass results from the shortening of the outer ring and by structuring the hinge pin as tube (19) and the avoidance of a clamping lid external to the hinge pin (20), as was previously the case. This allows a weight saving of 20% or more to be reached. In total, this gives rise to a joint bearing with lower mass, smaller structural size, lower price, and particularly user-friendly structural mode.

Obviously, many modifications and variations of the present invention are possible in light of the above teachings. It is therefore to be understood that within the scope of the appended claims, the invention may be practiced otherwise than as specifically described.

What is claimed is:

1. Joint bearing between two structural elements configured to be used in a warp knitting machine, one structural element being connected with a connecting joint and the other structural element being connected with a hinge pin, said joint bearing comprising:

an outer ring adapted for pressing into the connecting joint, the outer ring having a wall sized and shaped such that after pressing into place, the outer ring's inner circumference must be reworked to restore roundness; and a cage located between the hinge pin and the outer ring, having a plurality of cylindrical roller bodies, and a pair of stops for the actual axial guidance of the cage, the outer ring extending substantially only along the length of the roller bodies, the stops being separated from the outer ring and being mounted in the connecting joint.

2. Joint bearing in accordance with claim 1, comprising: lubricating means for lubricating the joint bearing, the stops comprising a pair of sealing rings located at opposite ends of the cage to seal the lubricating means.

3. Joint bearing in accordance with claim 2, comprising:
security rings supported on the connecting joint outside the sealing rings for supporting the sealing rings.

4. Joint bearing in accordance with claim 2, wherein the lubricating means comprises:
a pair of ports, and a pair of annular spaces at opposite ends of the cage for storage of grease, said pair of ports including a grease input port, and a grease exit port, one of said annular spaces being connected to the grease input port and the other of said annular spaces being connected to the grease exit port.

5. Joint bearing in accordance with claim 4, wherein the connecting joint has a pair of internal, circumferential, annular grooves, the annular spaces being positioned to communicate with and to be augmented by the annular grooves.

6. Joint bearing in accordance with claim 4, wherein the grease input port comprises:
a lubricating nipple, the grease exit port including a valve for automatically opening as a result of excess pressure in the lubricating means.

7. Joint bearing in accordance with claim 6, wherein the valve comprises:
a projection having an encircling groove, the grease exit port communicating with the encircling groove; and
an O-ring located in the encircling groove.

8. Joint bearing in accordance with claim 7, wherein the pair of ports are interchangeable in that either one may be either the grease input port or the grease output port.

9. Joint assembly between two structural elements configured to be used in a warp knitting machine, comprising:
a connecting joint;
a tubular hinge pin;
a lever having a first concavity lying in contact with the outside of the tubular pin, the lever being attached to the tubular pin by at least one fastener protruding out of the interior of the tubular hinge pin.

10. Joint assembly in accordance with claim 9 wherein the lever comprises a second concavity positioned adjacent the first concavity.

11. Joint assembly in accordance with claim 9, wherein the fastener has a head and wherein the tubular pin has on opposite sides of the connecting joint: a smaller transverse boring for protrusion therethrough of the fastener, a larger transverse boring in alignment with said smaller transverse boring for the protrusion therethrough of the head of the fastener, and a profile segment inside the tubular pin forming an abutment for the fastener.

12. Joint assembly in accordance with claim 11 wherein the lever comprises a second concavity positioned adjacent the first concavity.

13. Joint assembly in accordance with claim 9, comprising:
lubricating means for lubricating the joint bearing; and
a cage located around the hinge pin and having a plurality of cylindrical roller bodies, and a pair of stops for the actual axial guidance of the cage, the stops being mounted in the connecting joint, the stops comprising a pair of sealing rings located at opposite ends of the cage to seal the lubricating means.

14. Joint assembly in accordance with claim 13, comprising:
security rings supported on the connecting joint outside the sealing rings for supporting the sealing rings.

15. Joint assembly in accordance with claim 13, wherein the lubricating means comprises:

a pair of ports, and a pair of annular spaces at opposite ends of the cage for storage of grease, said pair of ports including a grease input port, and a grease exit port, one of said annular spaces being connected to the grease input port and the other of said annular spaces being connected to the grease exit port.

16. Joint assembly in accordance with claim 15, wherein the connecting joint has a pair of internal, circumferential, annular grooves, the annular spaces being positioned to communicate with and to be augmented by the annular grooves.

17. Joint assembly in accordance with claim 15, wherein the grease input port comprises:

a lubricating nipple, the grease exit port including a valve for automatically opening as a result of excess pressure in the lubricating means.

18. Joint assembly in accordance with claim 17, wherein the valve comprises:

a projection having an encircling groove, the grease exit port communicating with the encircling groove; and an O-ring located in the encircling groove.

19. Joint assembly in accordance with claim 18, wherein the pair of ports are interchangeable in that either one may be either the grease input port or the grease output port.

20. A method for installing a joint bearing in combination with two structural elements configured to be used in a warp knitting machine, and employing a connecting joint, a tubular hinge pin, a lever with a concavity, an outer ring, a cage with a plurality of cylindrical roller bodies, and a pair of stops, comprising the steps of:

pressing the outer ring into the connecting joint and reworking the outer ring to restore roundness thereto, the outer ring having a wall sized and shaped such that after pressing into place, the outer ring's inner circumference must be reworked to restore roundness;

installing the tubular hinge pin and the cage inside the outer ring by: locating the cage between the hinge pin and the outer ring, allowing the stops to perform the actual axial guidance of the cage, positioning the cage with the outer ring extending substantially only along the length of the roller bodies, and spacing the stops from the outer ring and mounting the stops in the connecting joint; and attaching the lever to the tubular hinge pin by placing the concavity in contact with the outside of the tubular pin, and attaching the lever to the tubular pin by at least one fastener protruding out of the interior of the tubular hinge pin.

\* \* \* \* \*